United States Patent [19]
Gretz

[11] Patent Number: 5,775,739
[45] Date of Patent: Jul. 7, 1998

[54] ELECTRICAL CONNECTOR

[75] Inventor: Thomas J. Gretz, Summit, Pa.

[73] Assignee: Arlington Industries, Inc., Scranton, Pa.

[21] Appl. No.: 781,723

[22] Filed: Jan. 10, 1997

[51] Int. Cl.[6] .................................................. F16L 11/118
[52] U.S. Cl. ........................................ 285/154.4; 285/218
[58] Field of Search ........................... 285/194, 195, 285/207, 217, 218, 162, 153.3, 153.4, 154.4; 174/152 R, 153 R

[56] References Cited

U.S. PATENT DOCUMENTS

| 1,644,305 | 10/1927 | Church | 285/218 |
| 1,644,306 | 10/1927 | Ledbetter | 285/218 |
| 3,174,776 | 3/1965 | Berger | 285/218 X |
| 4,157,799 | 6/1979 | Simon | 285/195 X |

Primary Examiner—Dave W. Arola

[57] ABSTRACT

An improved electrical connector for fastening electrical mechanical tubing (EMT) to junction boxes and other similar electrical enclosures. The seat on the connector for the sides of the access hole in an electrical enclosure include two wedge holding tabs that form a tight and secure fit after the fastening screw is tightened. The connector is of simple construction and easily manufactured with a low profile allowing it to be used in areas that are restricted for space.

3 Claims, 3 Drawing Sheets

ELECTRICAL CONNECTOR

FIELD OF THE INVENTION

This invention relates to an electrical connector for connecting electrical mechanical tubing (EMT) to electrical boxes and more specifically to an improved cable connector that will not rock within the knock out of and will hold fast in an electrical box once it is inserted and tightened therein. Inserting EMT within the connector and tightening the fastening means on the connector provides a connector that fits tightly within the knock out and prevents loosening of the connector from the box.

BACKGROUND OF THE INVENTION

It is common in the electrical industry to connect electrical metal tubing (EMT) to electrical junction boxes by means of a variety of standard threaded connectors. The exterior threaded portion of the connectors are pushed into a standard hole in a junction box or electrical panel and held in the hole by a standard lock nut.

A second type of connector is a type of non-threaded cylinder partially split longitudinally, which eliminates the need to have the two separate pieces which are required for a standard threaded connector. In this type of connector, a necked-down nose portion is inserted into an appropriate access hole in an electrical box. The EMT is fed into the rear portion of the split cylinder connector and a screw threaded within one half of the split cylinder is tightened thereby causing the threaded end of the screw to push against the EMT within the cylinder. Force transmitted along the longitudinal axis of the screw forces the opposing cylindrical half to spread away from its complementary cylindrical half. The connector is split such that the spreading of the cylindrical halves of the connector is more pronounced at its nose portion than at its rear portion. The nose portion, being heretofore inserted within an access hole to the electrical box, soon tightens against the walls of the electrical box, eventually securing the connector to the electrical box.

The present art non-threaded, split cylinder style of electrical connector is difficult to securely fasten to an electrical box. When the nose portion is pushed into the access hole or the knockout of the electrical box, the connector is not seated very securely in the hole, allowing the connector to rock back and forth even after being tightened.

SUMMARY OF THE INVENTION

This invention provides an electrical connector that allows EMT to be easily connected to an electrical box. The connector has wedge holding tabs that causes it to seat better in the knockout or access hole, grip the sides of the hole better and prevent it from rocking in the knockout or access hole.

OBJECTS AND ADVANTAGES

It is an object of the present invention to provide an electrical connector that improves the fastening of EMT to electrical boxes. The present invention includes wedge holding tabs on its nose portion that causes the connector to better and more securely seat in the access hole and prevent the fitting from rocking in the access hole after being tightened.

Other objects and advantages of the present invention will be better understood from the following description when read in conjunction with the appropriate drawings.

DESCRIPTION OF THE INVENTION

Figure 1:
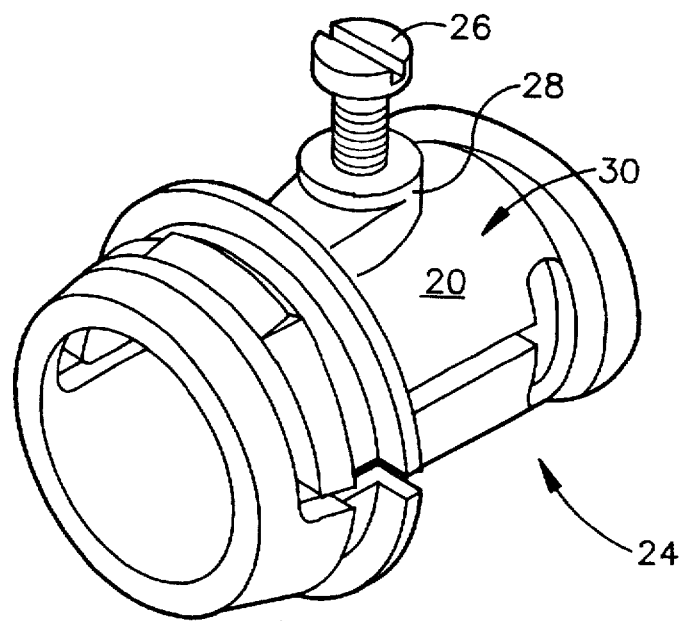
FIG. 1 is perspective view of the connector showing the nose portion with wedge holding tab in the foreground

The present invention comprises a connector for attaching electrical mechanical tubing (EMT) to an electrical junction box. FIG. 1 is a perspective view of the connector 20 with the nose portion 22 in the foreground. The nose portion 22 is inserted into the junction box. The rear portion 24 faces away from the junction box and accepts EMT (not shown) into its center portion. As shown in the perspective view, the connector is substantially a hollow cylinder with a fastening screw 26 located in a boss 28 formed into the cylindrical body 30 of the connector 20.

Figure 2:
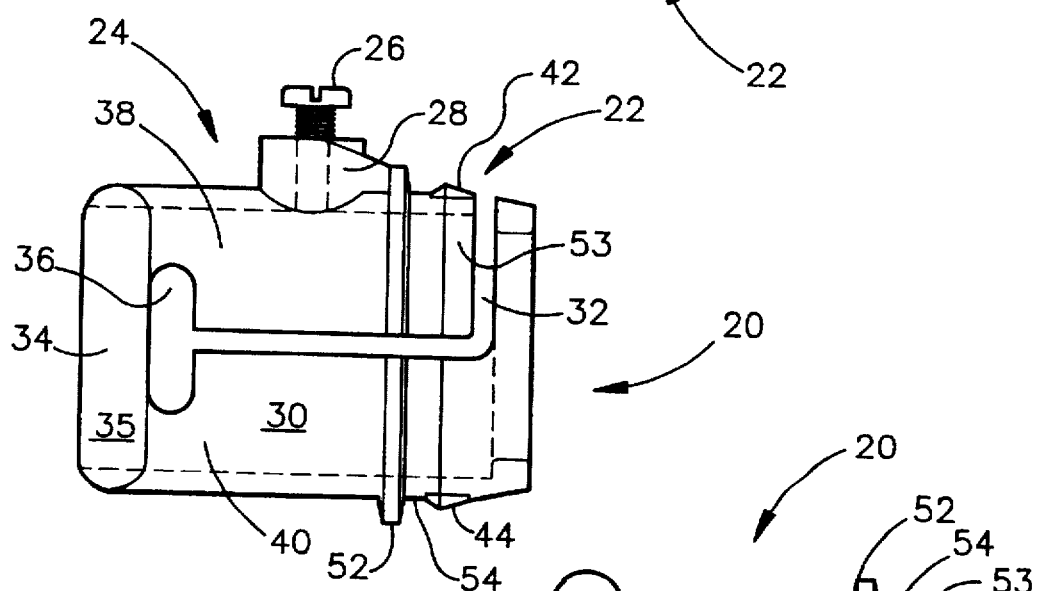
FIG. 2 is a side view of the connector of FIG. 1 showing the wedge holding tab and the split in the cylindrical connector body.
Figures 4, 5:
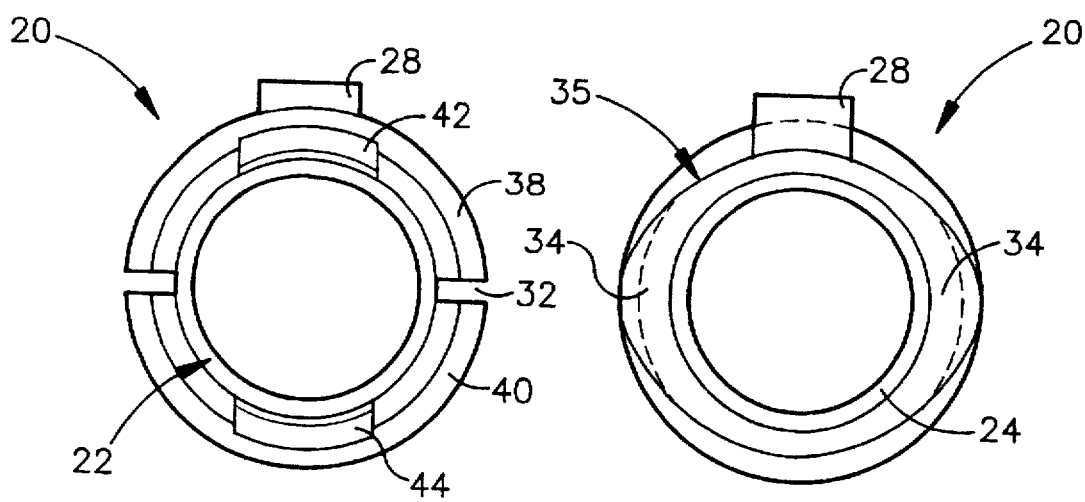
FIG. 4 is an end view showing the nose portion of the connector of FIG. 1.
FIG. 5 is an end view of the rear portion of the connector of FIG. 1.

As shown in the side view of the connector 20 in FIG. 2, the connector is split by a slot 32 that runs laterally from the nose portion 22 to essentially the center of the cylindrical body 30 and then longitudinally from near the nose portion 22 substantially through to a terminus or lateral slot 32 at the rear portion 24 of the connector. The slot 32 forms a partially split cylinder and a hinge 34 of the rear rounded flange 35. As can be seen in FIG. 5, the flange 35 is increased in diameter and thickness. An additional lateral slot 36 or terminus runs laterally along the cylindrical body 30 at the side of the hinge 34 and adds flexibility, allowing the split cylindrical body portions to flex more easily about the solid spring-like hinge 34. The slot 32 thereby defines two semi-cylindrical body portions which include a top half 38 including the boss 28 and the fastening screw 26 and a bottom half 40.

Also shown in FIG. 2 is the seat which runs around the entire periphery of the nose portion 22 and extends from outer flange 52 which limits the amount of connector 20 that is inserted into the junction box to the inner flange 53. It is to be noted that the nose portion 22 has its leading end tapered to better ease its location and entry into an access hole in a junction box. Top wedge holding tab 42 and bottom wedge holding tab 44 extend approximately half way across the seat 54 and across at least a portion of inner flange 53.

Figure 3:
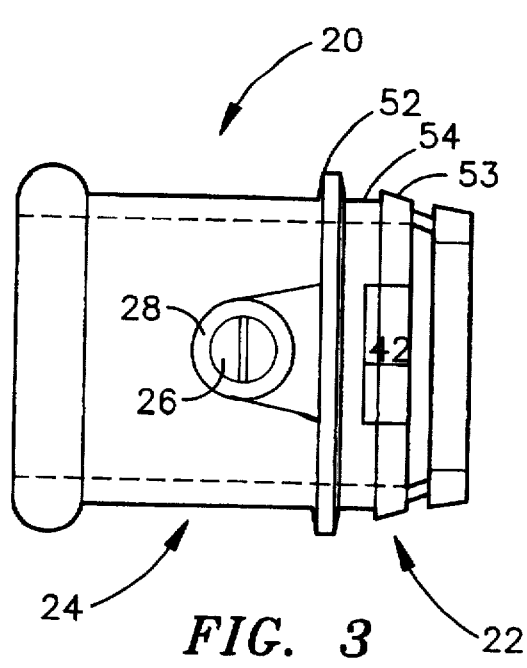
FIG. 3 is a top view of the connector of FIG. 1 showing the wedge holding tab and the fastening screw.

FIG. 3 is a top view of the connector showing the arrangement of the boss 28 and the fastening screw 26 with respect to the nose portion 22 and the rear portion 24 of the connector 20. Also, this view shows the top wedge holding tab 42, the seat 54, the outer flange 52 and the inner flange 53.

FIG. 4 is an end view of the connector 20 as viewed from the nose portion 22. A top wedge holding tab 42 is located in the top half 38 semi-cylindrical body portion and a bottom wedge holding tab 44 is located on the bottom half 40 semi-cylindrical body portion.

FIG. 5 is an end view of the connector 20 as viewed from the rear portion 24. The boss 28 does not extend far from the connector cylindrical body 30, thereby providing a low profile and enabling the connector 20 to be used in applications where space is tight.

Figure 6:
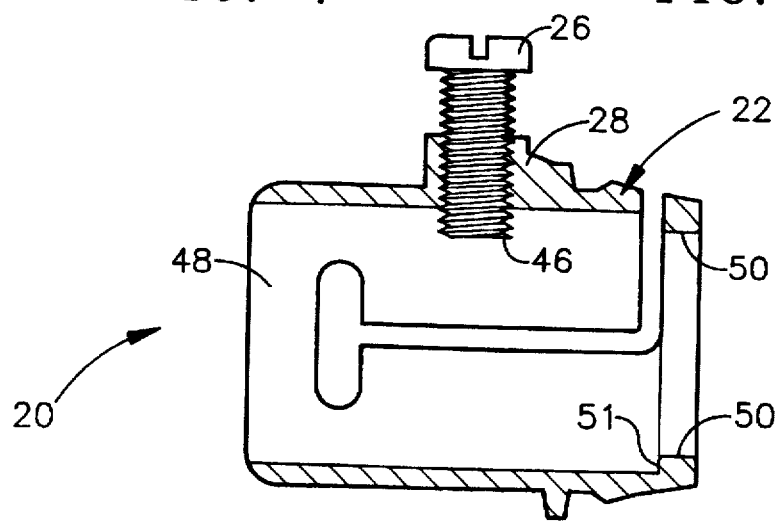
FIG. 6 is a cross-sectional view of the connector of the present invention taken along line 6—6 of FIG. 3.

The cross-sectional view of the connector in FIG. 6 shows the arrangement of the fastening screw 26 within the boss 28. The end 46 of the fastening screw 26 is flared to prevent the screw from backing easily out of the boss 28. The screw 26, when turned fully counterclockwise, provides an adequate passageway 48 within the semi-cylindrical body portions for the EMT to pass. A lip 50 is located around the inner diameter of the cylindrical connector at the extreme end of the nose portion 22. The lip 50 provides a stop 51 which prevents forward travel of the EMT into the cavity (not shown) of the junction box.

Figure 7:
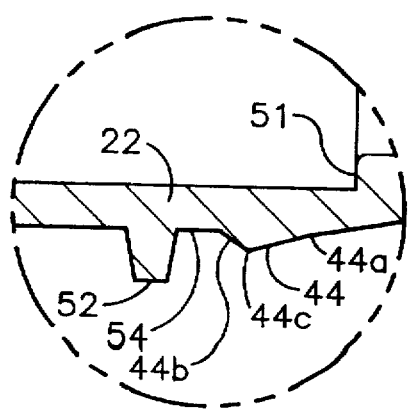
FIG. 7 is a close up view of the bottom wedge holding tab which helps hold the connector tight in an access hole of an electrical box.

FIG. 7 is a close-up cross-sectional view of the connector showing the outer flange 52, the seat 54, and the bottom wedge holding tab 44.

The inner or right face of the outer flange 52 is preferably angled at approximately 10 degrees from the vertical and has an outer diameter of typically 0.986 inches which will stop the connector from being inserted into a junction box beyond that face.

Figure 8:
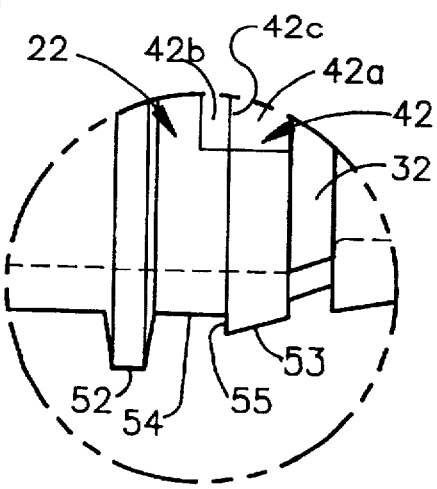
FIG. 8 is a close up view of the top wedge holding tab.

A close-up view of the top nose portion 22 of the connector is shown in FIG. 8 including the slot 32, the outer flange 52, the inner flange 53 and the top wedge holding tab 42. A seat 54 is located between the outer flange 52 and the inner flange 53. The width of the seat 54 is greater than the wall thickness at an access hole.

The top wedge holding tab 42 and bottom wedge holding tab 44 are identical. They each have a lead in ramp 42a and 44a, respectively, and a wedge 42b and 44b, respectively. Each wedge and ramp meet at an apex 42c and 44c, respectively, which is typically 0.031 inches from the bottom of the seat 54 and lies in the same plane as the inner side 55 of the seat which is the outer surface of the inner flange. The wedges 42b and 44b extend approximately half way across the seat and are arcuate, as seen in FIG. 4, with a width of typically 0.375 inches. While two wedge holding tabs are shown, there could be additional tabs that are evenly spaced about the periphery.

Figure 9:
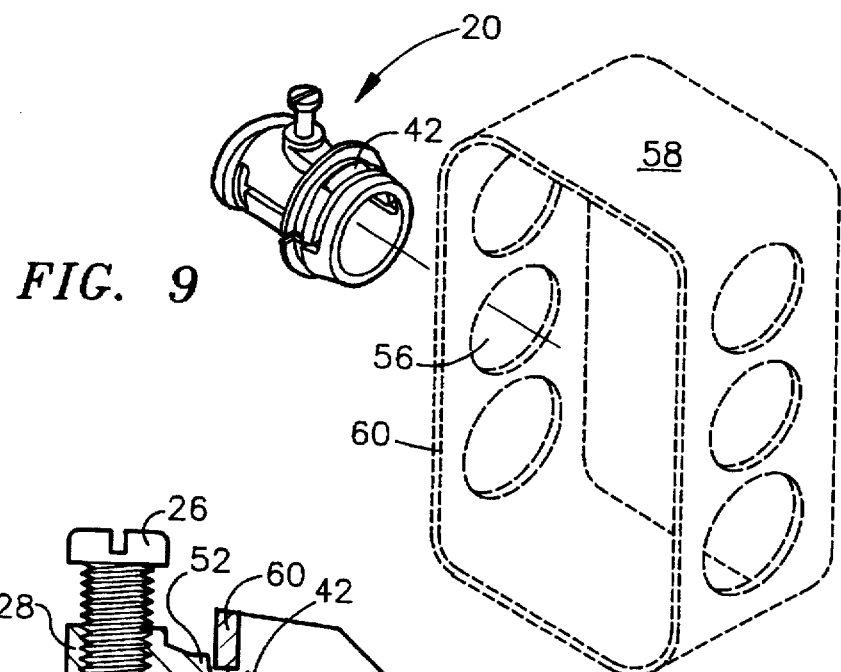
FIG. 9 is a perspective view of the connector of the present invention positioned to be inserted into an access hole in a junction box.
Figure 10:
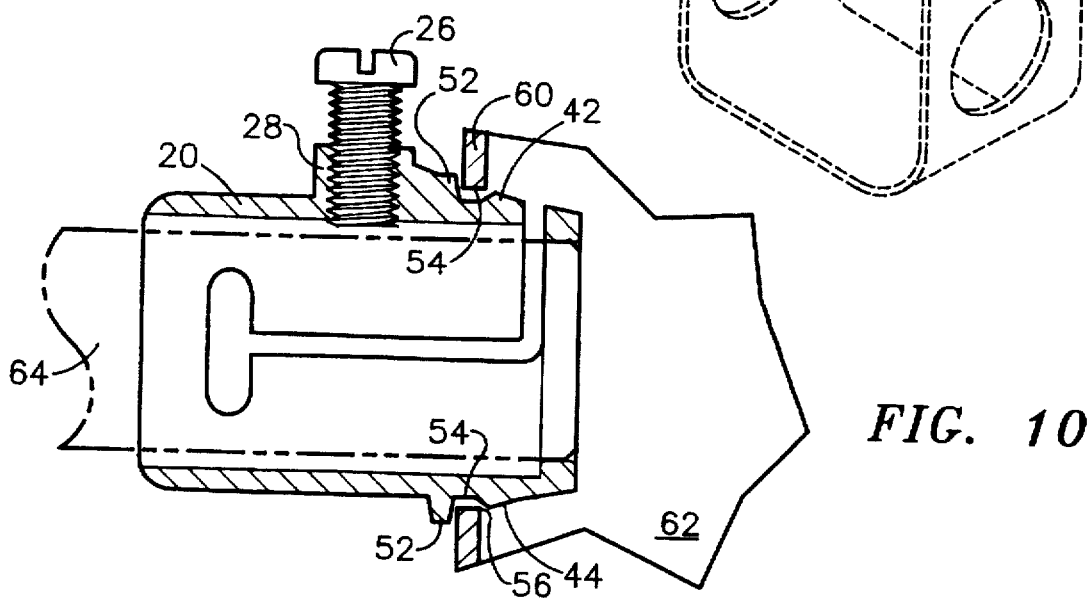
FIG. 10 is a cross-sectional view of a connector of the present invention inserted into an access hole in a junction box, prior to tightening the fastening screw showing the wedge holding tabs.

In applying the present invention, the connector 20 as shown in FIG. 9 is aligned with an access or knockout hole 56 in an electrical or junction box 58. The connector 20 is pushed into the knockout or access hole 56 until the bottom wedge holding tab 44 and the top wedge holding tab 42 are past the wall 60 of the junction box 58. The angled lead in ramps 42a and 44a assist in easing the entry over the wedge holding tabs. In this position, as shown in FIG. 10, most of both wedge holding tabs 42, 44 are within the cavity 62 of the junction box 58 and the annular inner periphery of the knockout or access hole 56 rests in the seat 54 between the outer flange 52 and inner flange 53 with the wedges 42b and 44b of the wedge holding tabs 42, 44 lying partly within the hole.

Figure 11:
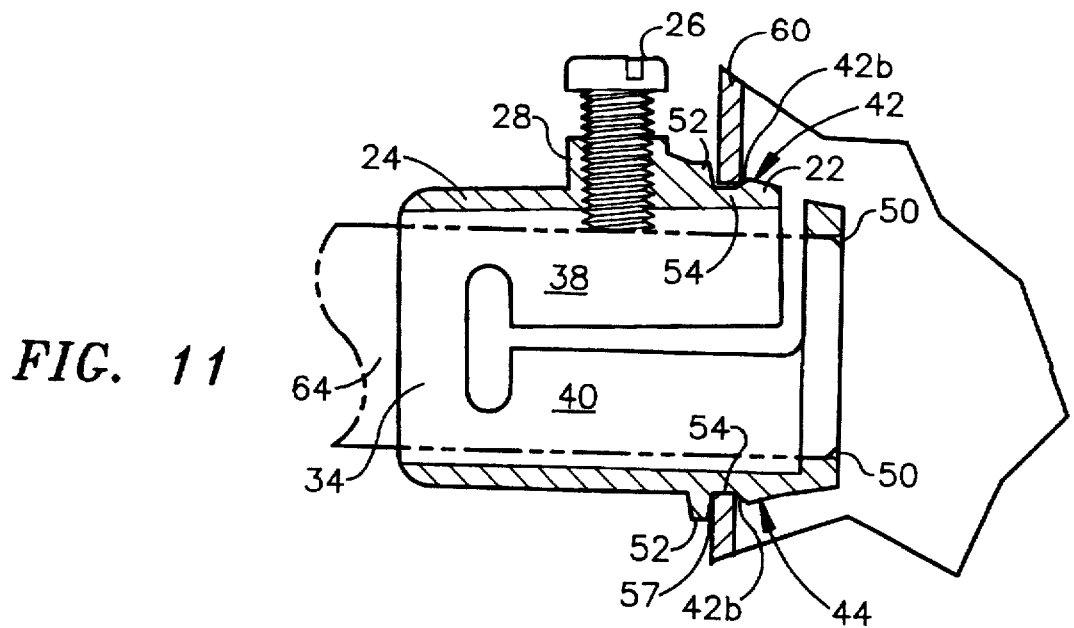
FIG. 11 is a cross-sectional view of a connector of the present invention inserted into an access hole in a junction box with the fastening screw tightened.

After the connector 20 is seated in the junction box 58, electrical mechanical tubing 64 is fed into the rear portion 24 of the connector 20, as shown in FIG. 11, until the EMT 64 contacts the lip 50 on the inner periphery at the end of nose portion 22. The fastening screw 26 is then tightened as shown in FIG. 11. As the fastening screw 26 is tightened, the top half 38 and bottom half of the cylindrical body 30 spreads apart by bending around hinge 34 which causes the seat 54 and wedges 42b and 44b to lock firmly onto the junction box wall 60. The tightened fastening screw 26 also exerts pressure on the inserted EMT 64 thereby holding it securely in place.

In the absence of the wedge holding tabs, the connector will frequently rock in the opening and tend to loosen. This is no longer the case as the wedges 42b and 44b of the wedge holding tabs do two things. First, as the connector spreads apart, the pressure on the inside edge of the access hole is concentrated at the two wedges which bite into the wall of the junction box. Second, the wedge forces the closure of the space 57 so that the inner surface of the outer flange 52 is forced against the outer surface of the junction box to increase the snugness of the fit. This is best seen in the lower part of FIG. 11. The same applies to the upper part of FIG. 11 but it is not as well shown.

The connector is typically constructed of a zinc die casting alloy such as zamak, but other materials such as brass, steel, plastic, or aluminum may also be used. The wall thickness at the hinge 34 portion of the cylindrical body 30 is typically 0.135 inches, as this portion is strengthened to stiffen the rear portion of the connector. The passageway 48 through the connector is typically 0.726 inches in diameter at the rear portion 24 of the connector 20 and typically 0.620 inches in diameter at the nose portion 22 of the connector. The slot 32 is typically 0.060 inches wide. The seat 54 is typically 0.010 inches wide. As stated earlier, the wedge holding tabs 42, 44 are typically wedge shaped with the wedge surface facing the seat 54 at an angle of typically 38.5° to the longitudinal surface of the connector 20 and the ramp surface away from the seat 54 at an angle of 21.5° to the longitudinal surface of the connector 20. The top wedge holding tab 42 is typically offset 180° from the bottom wedge holding tab on the cylindrical body of the connector.

Having thus described the invention with reference to a preferred embodiment, it is to be understood that the invention is not to be limited by the description herein but as defined as follows by the appended claims.

What is claimed is:

1. A connector for attaching electrical mechanical tubing to junction boxes fittings comprising:

a cylindrical body including a nose portion and a rear portion and a passageway therethrough, the outer periphery of said nose portion capable of being received within an access hole of a junction box, the inner periphery of said rear portion capable of receiving an end of tubing;

an outer flange located on the outer periphery of said nose portion having an inner face that stops said body from being inserted in an access hole past said inner face;

an inner flange located inboard of said outer flange on the outer periphery of said nose portion and having an outer diameter sufficiently small to be inserted in an access hole;

a seat on the outer periphery of said nose portion between said outer flange and said inner flange and having a width greater than the wall thickness of the wall at an access hole;

at least two wedge holding tabs located on the periphery of said nose portion at said inner flange and extending outward in a wedge part way across said seat and extending inward in a ramp;

a slot in said cylindrical body, said slot running inward of said wedge holding tabs first laterally from the outside surface of said nose portion approximately midway laterally through said cylindrical body, and, second, said slot continuing from said point longitudinally down the approximate center of said cylindrical body to a terminus at an area near the end of said rear portion, said slot defining a top half semi-circular body portion and a bottom half semi-circular body portion;

hinges formed by said area of said cylindrical body between said terminus of said slot and said end of said rear portion; and a screw mounted laterally within said cylindrical body and capable of tightening against an end of tubing inserted within said passageway within said cylindrical body thereby causing said top half semi-circular cylindrical body portion and said bottom half semi-circular body portion to bend apart around said hinge and locking said tubing within said passageway and locking said connector to the junction box.

2. The connector of claim 1 wherein said hinge on said cylindrical body is of a greater wall thickness than the remainder of said cylindrical body.

3. The connector of claim 1 wherein said slot furthermore includes at said terminus a wider slot cut laterally on said cylindrical body adjacent said hinge.

* * * * *